No. 642,146. Patented Jan. 30, 1900.
M. R. MOORE.
VALVE GEAR.
(Application filed Feb. 13, 1899.)
(No Model.)
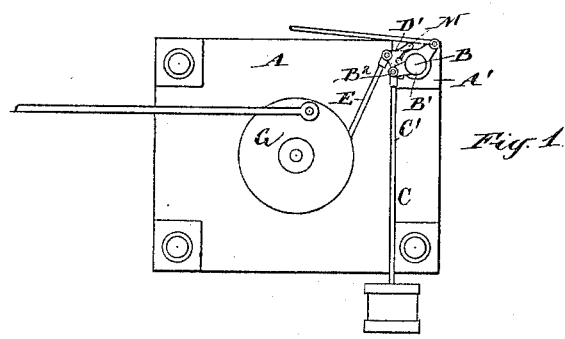
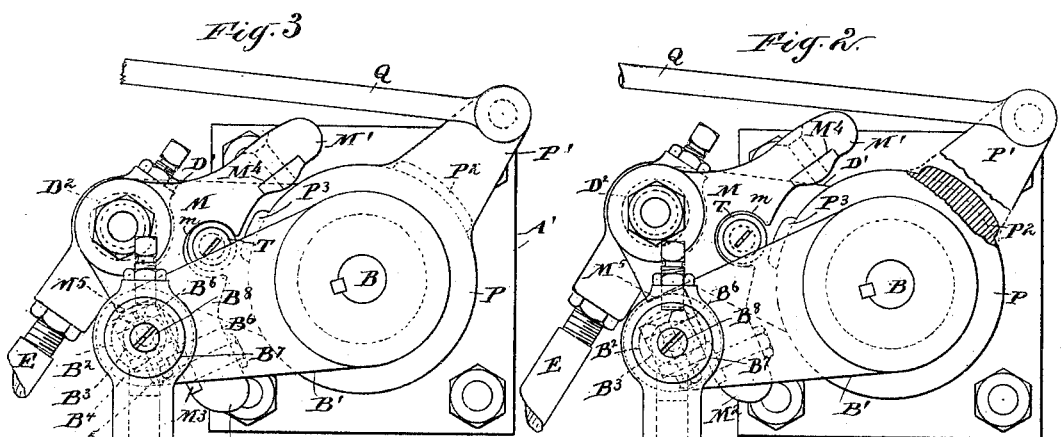
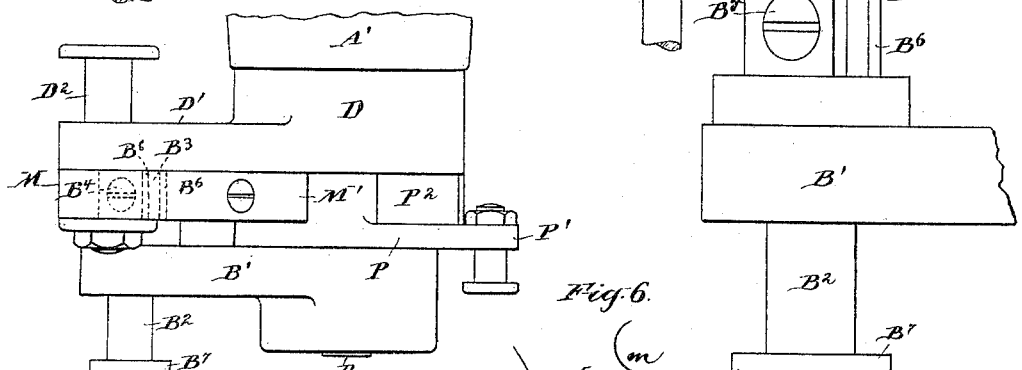
Witnesses:
William Paxton,
M. F. Boyle
Inventor:
Matthew R. Moore.
By Thomas Drew Stetson
Attorney

UNITED STATES PATENT OFFICE.

MATTHEW ROBERT MOORE, OF INDIANAPOLIS, INDIANA, ASSIGNOR TO THE ATLAS ENGINE WORKS, OF SAME PLACE.

VALVE-GEAR.

SPECIFICATION forming part of Letters Patent No. 642,146, dated January 30, 1900.

Application filed February 13, 1899. Serial No. 705,384. (No model.)

*To all whom it may concern:*

Be it known that I, MATTHEW ROBERT MOORE, a citizen of the United States, residing at Indianapolis, in the county of Marion, in the State of Indiana, have invented a certain new and useful Improvement in the Valve-Gear of Corliss Engines; and I do hereby declare that the following is a full and clear description thereof.

The improvement relates to the hook and the adjacent parts by which is effected the alternate connection and disconnection of the positive working mechanism with the arm of the valve-stem. I provide an improved construction for receiving the action of the hooks to open the steam-valves. I inclose in a just sufficiently larger recess in the hook a soft-surfaced pin set in the operating part which serves as a silent and efficient stop to restrain any excess of turning motion of the hook. I provide by the construction of the hook for performing the double function of a push-down and a means for further insuring the engagement of the hook.

The accompanying drawings form a part of this specification and represent what I consider the best means of carrying out the invention.

Figure 1 is a side elevation. Fig. 2 is a corresponding view of a portion on a larger scale. This shows the hook in the act of descending to be engaged. Fig. 3 shows a corresponding view of certain portions at a later stage. Fig. 4 is a corresponding plan view. Fig. 5 is a plan view of a portion corresponding to Fig. 4, but more fully shown. Fig. 6 is a view of a portion of the hook and also showing in section the extension and its catch-plates with which the hook engages.

Similar letters of reference indicate corresponding parts in all the figures where they appear.

A is a side of the cylinder or of the casing which incloses it, and A' a bracket bolted rigidly thereon, which serves as a bearing for the extended valve-stem. A contracted extension serves also as a bearing for the cam-ring.

B is the valve-stem, and B' the ordinary stout arm, rigidly keyed thereon and through which the motion is communicated in working the valve.

$B^2$ is a "crank-pin" set in the outer end of this arm and extending parallel to the axis of the valve-stem.

$B^3$ is an extension of oblong rectangular section on the inner end of this pin. Upon this extension are secured by a transverse bolt $B^4$ and nut $B^5$ two exchangeable catch-plates $B^6 B^6$, the edges of which serve for the hook to engage and from which it is detached again at each revolution.

C' is the upper end of the dash-pot rod C, which is connected to an ordinary vacuum dash-pot, which effects the rapid closing motion of the valve. The front of the pin $B^2$ is formed with a removable flat head $B^7$, secured by a screw $B^8$.

D is a hub mounted with liberty to turn on the end of the valve-stem bracket and having an arm D', equipped with a crank-pin $D^2$, extending inward or toward the cylinder, by which motion is received through a link E from the wrist-plate G, and thus partaking of the positive rocking motion of the latter. The crank-pin $D^2$ is extended on the outward side of the arm D', forming a pin upon which the hook-lever is pivotally mounted.

I will designate the entire hook as M and indicate special parts thereof by supernumerals, as M', &c. There are, as usual, two arms to the hook, set in this case nearly at right angles. As the lifting-arm D' describes its arc up and down with the regular motion of the engine, carrying the hook by its pivot $D^2$, the upper arm M' of the hook serves as a contact-piece to engage the shifting cam $P^2$ and trip-off at the variable periods required, while the lower arm $M^2$ carries the hook-piece $M^3$, which engages at each lifting motion with the lower catch-plate $B^6$ and lifts the arm B' to open the valve, and then when it is deflected inward by the contact of the cam $P^2$ with the arm M' effects the unhooking.

I effect the "push-down" to insure the closing of the valve should the dash-pot fail to effect it promptly by simply producing a deep offset $M^5$ in the outer face of the lower arm $M^2$ of the hook and arrange to allow this offset to strike the upper catch-plate $B^6$ whenever the descending motion of the latter is tardy. The construction of the push-down in this manner simply as a sufficiently large offset in the outer face of the arm $M^2$ of the hook simplifies the mechanism. The hook alone performs all the functions of the ordinary detachable push-down and in all cases where the push-down comes into play receives the strain favorably to promote the engagement of the hook. It will be noted that the hook descends in a slightly-deflected position and that consequently any resistance to the descent of the hook is felt on the under side of this offset $M^5$ near its outer point and tends strongly to turn the hook in the proper direction to insure its engagement by the hook-piece $M^3$. Thus the push-down offset does double duty. The contact of the wide offset $M^5$ with the upper catch-plate insures the instant turning or swinging of the hook to cause the effective engagement of the hook-piece $M^3$ with the lower catch-plate, so that the moment the motion of the hook is reversed it begins to lift the dash-pot and opens the valve. There are three agencies—gravity, inertia, and contact with the catch-piece—which insure the engagement of the hook.

P is the ordinary cam-ring, loosely surrounding the valve-stem bracket and having an arm P', to which is connected the cam-rod Q, which extends to a governor (not shown) and is operated thereby in the ordinary manner. $P^2$ is the governing-cam carried on this ring and movable therewith as it is partially rotated in one direction and the other by the action of the governor, so as to receive the swell $M^4$ at earlier or later periods and swing the hook on its pivot, causing it to detach and allow the valve to close at the right times to effect the regulation. $P^3$ is an ordinary safety-cam carried on the same cam-ring, which performs its usual function of completely stopping the engine when through accident, as the breaking of a belt, the governor loses its ordinary control.

My construction works in all respects in the ordinary manner, except that the hook engages more surely. It insures the prompt change of the point of cut-off with every change of speed, attains the perfection of regulation and the economy in the use of steam for which the Corliss engine is justly valued, and allows the engine to be worked with any velocity without developing any centrifugal force in the hook to oppose the engaging motion. The arm $M^2$ may be made considerably heavier or arranged to have more leverage than the arm M', and in such case the centrifugal force will tend to facilitate the engagement; but even if this arm is made with only a slight excess or of about equal weight and leverage the opposition to the engagement, due to the centrifugal force with the ordinary arrangement hooking inward, is entirely avoided. In the ordinary arrangement a spring is used to effect the engagement; but in my construction the hook alone without a spring will engage with certainty. My experiments indicate that the hook will catch at any speed. The shoulder or offset $M^5$ is faced with leather to make the engagement silent.

T is a hook-stop covered with leather to act silently, set firmly in the face of the lifting arm D' and received in a sufficiently larger recess $m$ in the hook. There should be sufficient liberty to allow the proper motion of the hook, but not enough to allow the same to get much out of its proper place under any conditions.

Modifications may be made without departing from the principle or sacrificing the advantages of the invention. The hook-piece $M^3$ is shown as square, detachably secured by a bolt and capable of being shifted to present each side of the several edges successively, thus giving eight surfaces to withstand wear. The catch-plates $B^6$ are square and correspondingly changeable, giving a corresponding number of edges to be successively presented for wear; but a less elaborate construction of these parts will serve.

I have shown the contact-piece $M^4$ on the hook as easily exchangeable to allow for wear or to substitute a different size or form when required. This feature may be omitted, a corresponding swell being formed integral in the arm M' and a sharp angle formed integral in the place of the exchangeable hook-piece $M^3$. In such case the cam $P^2$ and in case of accident the cam $P^3$ will contact directly with the body of the hook and the parts will operate the same, but they will not be so durable.

I claim as my invention—

1. In a Corliss engine, having the valve-stem B with its arm B', the combination therewith of the hook M, the pin $B^2$ having an extension $B^3$ adapted to carry the two catch-plates $B^6$ and securing means as the bolt $B^4$ and nut $B^5$, and the removable head $B^7$ and securing means $B^8$ therefor, all substantially as herein specified.

2. In a Corliss engine, having the positively-rocking part D' carrying the soft-surfaced stop T on its face, the valve-stem B with its arm B', and the cam-ring P carrying the cams $P^2$ and $P^3$, the combination therewith of the hook M arranged to be engaged by an outward movement of said hook, and provided with the recess $m$ larger than the said stop and holding the same, adapted to allow the hook to swing but to limit its movement, all substantially as herein specified.

In testimony that I claim the invention above set forth I affix my signature in presence of two witnesses.

MATTHEW ROBERT MOORE.

Witnesses:
 F. H. YOUNT,
 ROLLIN DEFREES.